(12) United States Patent
Roux et al.

(10) Patent No.: US 8,551,326 B2
(45) Date of Patent: Oct. 8, 2013

(54) PROCESS FOR CATALYTIC CRACKING WITH FINE CONTROL OF THE RESIDUAL COKE CONTENT ON THE CATALYST AFTER REGENERATION

(75) Inventors: Romain Roux, Rueil Malmaison (FR); Thierry Gauthier, Brignais (FR)

(73) Assignee: IFP Energies Nouvelles, Rueil Malmaison Cedex (FR)

( * ) Notice: Subject to any disclaimer, the term of this patent is extended or adjusted under 35 U.S.C. 154(b) by 224 days.

(21) Appl. No.: 13/048,184

(22) Filed: Mar. 15, 2011

(65) Prior Publication Data

US 2011/0220548 A1 Sep. 15, 2011

(51) Int. Cl.
*C10G 11/18* (2006.01)
*B01J 21/20* (2006.01)
*B01J 38/20* (2006.01)
*B01J 38/34* (2006.01)
*B01J 38/30* (2006.01)

(52) U.S. Cl.
USPC ............... 208/113; 208/46; 208/49; 208/106; 208/146; 208/152; 208/163; 502/20; 502/38; 502/41; 502/43

(58) Field of Classification Search
USPC ............. 208/46, 49, 106, 113, 146, 152, 163; 502/20, 38, 41, 43
See application file for complete search history.

(56) References Cited

U.S. PATENT DOCUMENTS

| | | | |
|---|---|---|---|
| 4,417,975 A | 11/1983 | Myers et al. | |
| 4,601,814 A | 7/1986 | Mauleon et al. | |
| 4,666,586 A | 5/1987 | Farnsworth | |
| 4,780,195 A | 10/1988 | Miller | |
| 4,849,091 A * | 7/1989 | Cabrera et al. | 208/113 |
| 5,077,251 A | 12/1991 | Owen et al. | |
| 5,455,010 A * | 10/1995 | Lomas et al. | 422/144 |
| 2006/0076269 A1* | 4/2006 | Lomas | 208/113 |

OTHER PUBLICATIONS

KBR, Dense Phase Catalyst Cooler, Undated.*
Search Report of FR 1001031, date of completion Jul. 28, 2010.

* cited by examiner

*Primary Examiner* — Walter D Griffin
*Assistant Examiner* — Derek Mueller
(74) *Attorney, Agent, or Firm* — Millen, White, Zelano & Branigan, P.C.

(57) ABSTRACT

This invention describes a two-stage regeneration zone that has a regenerated catalyst circuit such as the one that results from the mixing of a partially regenerated catalyst with a residual coke rate of between 0.3 and 0.7% and a totally regenerated catalyst with a coke rate that is less than 0.15%. All things being equal, this double-population regenerated catalyst enables the maximization of the LCO yield.

10 Claims, 3 Drawing Sheets

PROCESS FOR CATALYTIC CRACKING WITH FINE CONTROL OF THE RESIDUAL COKE CONTENT ON THE CATALYST AFTER REGENERATION

FIELD OF THE INVENTION

This invention relates to the field of the catalytic cracking of petroleum fractions, more particularly the so-called "heavy" fractions, i.e., fractions of which less than 10% by weight of hydrocarbon have a boiling point that is less than 350° C.

The invention relates more particularly to a catalytic cracking process that consists of at least one reaction zone that brings the catalyst and the hydrocarbons into contact for implementing the catalytic cracking reactions, and a zone for regeneration of the catalyst that consists of at least two interconnected fluidized beds and that enables the fine control of the residual coke content on the catalyst with contents that are greater than 0.15% by weight, preferably greater than 0.25% by weight. The particular arrangement of the regeneration zone that is the object of this invention makes it possible to limit the activity of the catalyst in the reaction zone, whereby the process is characterized by the fact that a portion of the catalyst is exposed to total combustion conditions, the other portion being subjected to partial combustion conditions, and the two portions then being mixed to deliver a regenerated catalyst with a residual coke content that is perfectly controlled and is greater than 0.15%.

The invention is particularly advantageous to implement in the case where it is sought to maximize the intermediate cracking fractions such as the LCO, or in a more general manner, in the case where it is desired to control the activity of the catalyst coming into the reaction zone by maintaining a coke concentration that is greater than 0.15%, preferably greater than 0.25%, on the regenerated catalyst.

EXAMINATION OF THE PRIOR ART

The FCC is a well-known process that has undergone numerous changes since the 1930s (see Avidan, A., Shinnar, R., "Development of Catalytic Cracking Technology: A Lesson in Chemical Reactor Design," Ind. Eng. Chem. Res., 29, 931-942, 1990). The FCC is a process that is characterized by a reaction zone in which the cracking reactions are implemented on a zeolitic-type catalyst, and a regeneration zone that makes it possible to eliminate by combustion the coke that is deposited on the catalyst during cracking reactions.

The catalyst that is coked after cracking in the reaction zone in general contains 0.5% to 2% coke, generally around 1%. The activity of the catalyst essentially depends on the content of the coke that is deposited on said catalyst, therefore the quality of the regeneration. If the catalyst is regenerated well, with a residual coke content (called CRC) that is less than 0.15%, it is considered that the activity of said catalyst is restored.

There are several modes for regenerating catalysts.

In the processes that conventionally treat the vacuum distillate-type feedstocks that contain limited quantities of residue, regeneration is done in general in a regeneration zone that consists of a single fluidized bed or optionally in a regeneration zone that consists of a bed that is transported with partial recycling of the regenerated catalyst to maintain a suitable temperature (so-called "fast combustor" technology that can be translated as rapid combustion). It is possible to find a description of this technology in, for example, "Guide to Fluid Catalytic Cracking Part One, page 35, FIG. 15, published by Grace Davidson, 1993).

When the combustion of a coked FCC catalyst is implemented, it is possible to work with partial combustion or with total combustion. These two modes, well known to one skilled in the art, are differentiated by stoichiometric conditions of reaction between the oxygen that is contained in the regeneration air and the coke that is deposited on the catalyst.

With partial combustion, combustion is accomplished with little oxygen. There is not enough oxygen present in the regeneration air to implement the total combustion of the carbon and the hydrogen that are present in the coke. As a result, the combustion leads to the joint formation of carbon oxides, carbon dioxide, and water.

With total combustion, there is a slight excess of oxygen relative to stoichiometry, and the combustion essentially leads to the formation of carbon dioxide and water.

The control of the combustion on a single regenerator is primarily linked to the ratio between the quantity of oxygen that is available for the combustion and the quantity of coke to be burned. Thus, if the ratio by mass between streams of air and coke in the regenerator is close to 9-10, then the $CO/CO_2$ ratio in the smoke is close to 1.

If, in contrast, the ratio by mass between the streams of air and coke at the input of the regeneration is closer to 13-15, then it is possible to accomplish total combustion of the coke, whereby the $CO/CO_2$ ratio in the smoke is then less than 0.1, and even 0.01.

Total combustion is more exothermic than partial combustion. For the same quantity of burned coke, it therefore results in a more significant reheating of the catalyst. It makes it possible to totally regenerate the catalyst, and the coke content of the catalyst after regeneration is in general much less than 0.10% by weight, and even very often less than 0.05% by weight. Under these conditions, the coke that is still present on the catalyst at the regeneration output in general represents less than 5-10% of the incoming coke.

The partial combustion is less exothermic and leads to a more limited reheating of the catalyst. In contrast, it does not make it possible to totally regenerate the catalyst, and in general the higher the $CO/CO_2$ ratio of the smoke, the more the coke content on the regenerated catalyst increases. It is common to obtain coke contents on the regenerated catalyst at the regeneration output of between 0.3 and 0.7% by weight, or 15% to 50%, of the coke entering the regenerator.

It is well known to one skilled in the art that the catalytic activity of the catalyst essentially depends on the content of the coke that is deposited on said catalyst.

In a general manner, the conversion decreases when the residual coke content on the regenerated catalyst increases.

Furthermore, it is also well known that the reduction of the conversion makes it possible to maximize the production of intermediate cracking radicals such as the LCO (abbreviation of Light Cycle Oil), which is an FCC gas oil that results from the cracking of the vacuum distillate and/or the vacuum residue. With high conversion, this LCO is actually consumed by the secondary cracking reactions.

The maximization of the LCO therefore passes through the cracking at moderate conversion levels that can be attained either by lowering the cracking temperature or by limiting the circulation of catalyst or by limiting the activity of the catalyst by implementing, for example, a partial regeneration.

Controlling an FCC that is equipped with a single regenerator and that operates with partial combustion is not easy. It is actually difficult to control both the residual coke content and the $CO/CO_2$ ratio of the smoke. Actually, the combustion kinetics that govern the conversion of carbon to CO or to $CO_2$ naturally depend on temperature and partial water pressure, but these reactions are more or less accelerated based on the metal content of the catalyst or its composition.

For a constant quantity of injected air relative to the quantity of coke that is burned, the combustion is therefore more or less partial or total, and the CO/CO2 ratio of the smoke, the temperature or the residual coke content can vary significantly. The residual coke content, however, is not measured on line in the unit and can significantly modify the catalytic activity in the riser.

It is well known that an FCC that operates with partial combustion makes it possible to treat heavier feedstocks than an FCC that operates with total combustion. To treat heavier feedstocks such as hydrotreated atmospheric residues, it may be advantageous to implement regeneration in several stages, as described in, for example, the U.S. Pat. Nos. 4,455,6479 or 4,601,814.

Double regeneration implements a first regeneration stage, performed in a fluidized bed, in which the coked catalyst that is obtained from the reaction zone is brought into contact with the air. In the text below, Reg 1 in abbreviated form is called the first stage of the regeneration or the first regenerator, and Reg 2 is called the second stage of the regeneration or the second regenerator.

In the first regeneration stage, denoted Reg 1, in general between 50% and 80% of the coke that is deposited on the catalyst is burned using the contact with only a portion of the required air for regenerating the entire catalyst.

The CO-rich smoke is evacuated from Reg 1. The residual CO is burned outside of the unit. The heating of the catalyst in the first regenerator is limited by partial combustion, whereby a portion of the combustion heat is produced outside of the regenerator by the final combustion of CO in a separate boiler that makes it possible, for example, to produce vapor.

The partially regenerated catalyst is transported into the second regeneration stage in a fluidized bed that is denoted Reg 2. When the Reg 2 is located above the first regenerator, which is the most common case, the transport of the catalyst from Reg 1 to Reg 2 can be accomplished by a pneumatic transport line with air, whereby the transport air participates in the regeneration process.

In the second regenerator, the quantity of air that is introduced is in excess relative to the requirements of the combustion, which is easily verifiable by the continuous measurement of excess oxygen in the smoke (generally between 0.5 and 4% by volume of dry smoke, preferably between 1 and 3% by volume).

The exothermicity of the total combustion is significant and causes, despite the combustion of smaller quantities of coke than in the first regenerator, a heating of the catalyst that is still more significant. Thus, by way of example, a temperature profile that is conventionally encountered in catalytic cracking of the residue with this type of regeneration is as follows:

Input catalyst temperature Reg 1=510° C.
Output catalyst temperature Reg 1=690° C.
Output catalyst temperature Reg 2=760° C.

At the input of the first regenerator, the coke content here is approximately 1.4%.

At the output of the first regenerator, the coke content of the catalyst is approximately 0.4%-0.5%, and at the output of the second regenerator, the coke content of the catalyst is approximately 0.05%.

In all of the cases, a coke concentration that is less than 0.25% can be easily attained at the output of Reg 2 as soon as there is excess oxygen in the smoke of Reg 2.

It is well established that the double regeneration makes it possible to treat even heavier feedstocks than the single regenerators operating with partial combustion that themselves make it possible to treat heavier feedstocks than the single regenerators operating with total combustion.

In a general manner, the configuration of the regeneration zone orients the thermal balance of the FCC and makes it possible to treat variable Conradson carbon feedstocks.

Table 1 below summarizes the feedstocks that can be treated by an FCC based on the type of regeneration, whereby the feedstock is described here by the Conradson carbon that well summarizes its suitability for coking.

TABLE 1

| | |
|---|---|
| Single Regeneration with Total Combustion | <2.5% Conradson Carbon |
| Single Regeneration with Partial Combustion | <3.5% Conradson Carbon |
| Double Regeneration (R2R Process) | <6-7% Conradson Carbon |

This invention makes it possible to treat all of the feedstocks according to Table 1 with a very fine control of the residual coke content at the regeneration output, which makes it possible to orient the structure of the yields arbitrarily, in particular to the LCO when said coke content of the catalyst at the input of the reaction zone is within the range of 0.25% to 0.7%, based on feedstocks and catalysts, and preferably within the range of 0.3%-0.4%.

SUMMARY DESCRIPTION OF THE FIGURES

SUMMARY DESCRIPTION OF THE INVENTION

Figure 1:
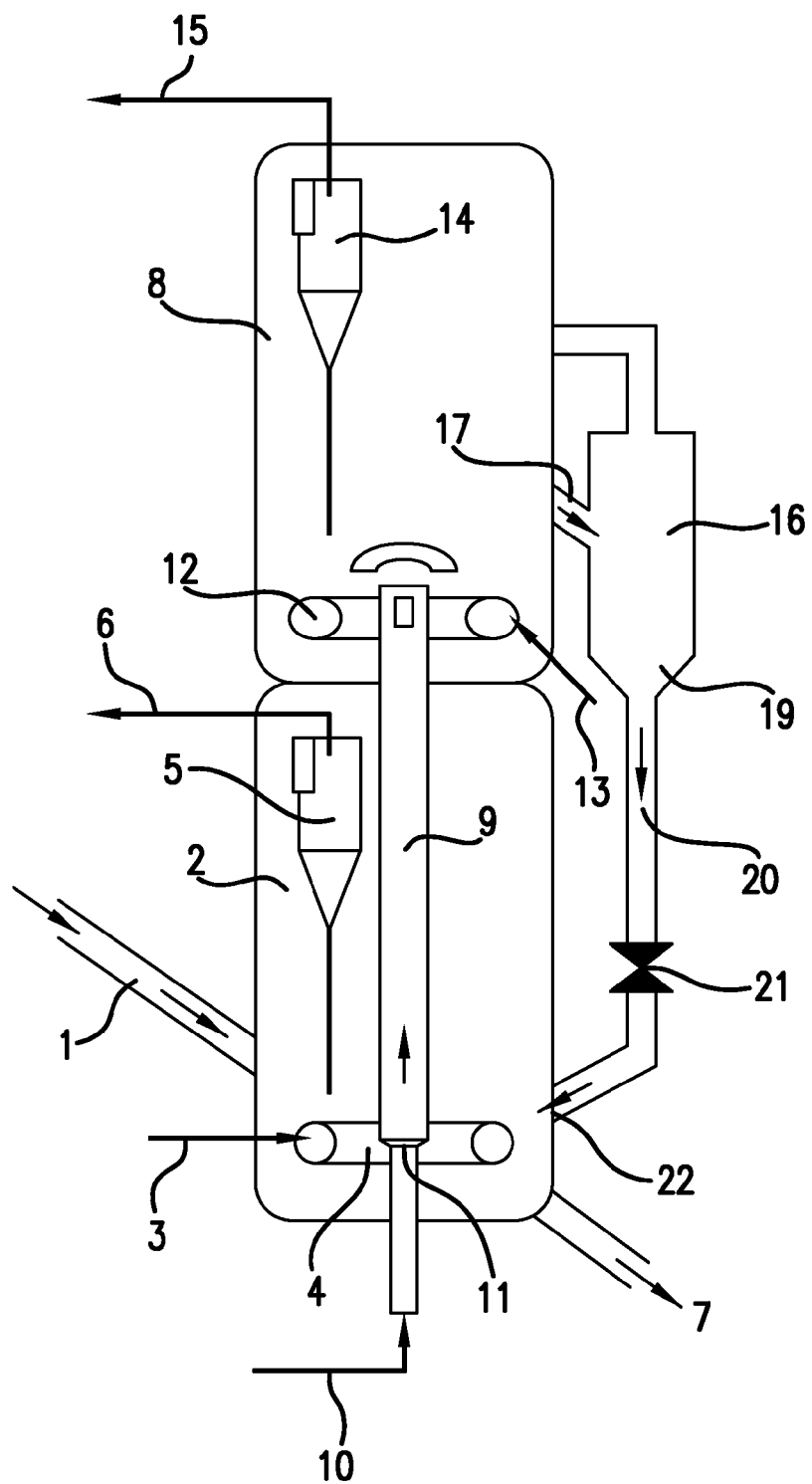
FIG. 1 shows an embodiment of the invention in which the catalyst that is obtained from the second regeneration stage returns to the first regeneration stage.

This invention relates to an implementation of the regeneration of the catalyst in a catalytic cracking process, in which a very fine control of the residual coke level is sought, i.e., after regeneration.

To reach this objective, the invention describes a two-stage regeneration zone: a first stage working with partial combustion and a second stage working with total combustion, whereby the circuit of the catalyst between the two stages comprises a return line of the totally regenerated catalyst that is obtained from the second stage to the first stage, or to a dedicated fluidized chamber in which said catalyst is mixed with the partially regenerated catalyst that is obtained from the first stage.

This invention makes it possible to obtain a fine adjustment of the residual coke level on the regenerated catalyst by the control of the flow rate of the catalyst that is obtained from the second regeneration stage.

The catalyst that results from the mixture and that has the required level of residual coke is sent to the reaction zone in which the cracking reactions of the heavy feedstock are implemented.

Ultimately, the catalyst that is obtained from the regeneration is partially regenerated with a mean residual coke content that is greater than 0.15%, preferably greater than 0.25%, whereby a portion of the regenerated catalyst has been exposed to total combustion conditions and has a residual coke content that is less than 0.1%.

Of course, it is possible to multiply the regeneration zones according to this invention so as to deliver from each regeneration zone a partially regenerated catalyst with the desired residual coke content so as to supply one or more reaction zones.

The invention can be defined as a process for catalytic cracking of a hydrocarbon feedstock with a boiling point that is greater than 350° C., making possible a fine control of the residual coke level on the regenerated catalyst, whereby said process comprises at least one reaction zone that brings into contact, in a transported bed, the hydrocarbon feedstock to be treated and the catalyst, and a regeneration zone of said coked catalyst at the output of the reaction zone, whereby said regeneration zone is divided into a first regeneration stage in a fluidized bed working with partial combustion (i.e., anaerobic) and generating a catalyst whose residual coke rate is between 0.3% and 0.7%, and a second regeneration stage in a fluidized bed that is placed in series relative to the first stage, and working with total combustion (i.e., with excess air) and generating a catalyst whose residual coke rate is less than 0.15%, whereby the regenerated catalyst that is obtained following the mixing of the partially regenerated and totally regenerated catalysts has a residual coke rate that is greater than 0.15%, preferably greater than 0.25%, and is sent into the reaction zone.

More specifically, the invention can be broken down into three primary embodiments:

A first mode in which the totally regenerated catalyst that is obtained from the second regeneration stage is reintroduced into the first regeneration stage by a pipe that is equipped with a valve for regulating the catalyst flow rate.

A second embodiment of the invention in which the totally regenerated catalyst that is obtained from the second regeneration stage is introduced into a dedicated chamber by means of a pipe of the same type as the preceding one, whereby said chamber enables the mixing with the partially regenerated catalyst that is obtained from the first regeneration stage.

A third embodiment of the invention in which the first regeneration stage (the one that corresponds to partial combustion) is positioned above the second regeneration stage and where the catalyst that is obtained from the second stage (the one corresponding to total combustion) is sent back to the first stage.

According to the first and second embodiments of the invention, the totally regenerated catalyst that is obtained at the output of the second regeneration stage is:

a) Either sent back by a connecting pipe into the first regeneration stage, starting from which the catalyst that results from the mixing of the two stages and that has the desired coke level is sent back to the reaction zone, b) Or sent via a connecting pipe into a dedicated mixing chamber in which the totally regenerated catalyst is mixed with the partially regenerated catalyst that is obtained from the first regeneration stage, a chamber starting from which said catalyst that results from the mixing and that has the desired coke level is sent back into the reaction zone, whereby the process is characterized in that the circulation of catalyst from the first stage to the second regeneration stage is rigorously controlled by a valve that is placed in the case a) on the connecting pipe between said first and second stages, and in the case b) on the line that connects the second stage and the dedicated chamber.

DETAILED DESCRIPTION OF THE INVENTION

As it was seen above, the control of the coke content of the regenerated catalyst for adjusting the catalytic activity is not simple to carry out using available regeneration technologies, in particular the technology with a single regeneration stage.

The object of this invention is therefore to remedy this difficulty by proposing a catalyst regeneration system that makes possible a fine control of the coke content on the residual catalyst using an original arrangement of the regeneration zone.

The proposed system is characterized by the fact that the regeneration zone consists of at least two fluidized-bed stages, the catalyst coming from the reaction zone being introduced into the first stage that operates with partial combustion, and then into the second stage operating with total combustion and placed in series relative to the first stage, whereby the regenerated catalyst that is obtained from the second stage returns to the reaction zone after mixing with the catalyst that is obtained from the first stage, and the circulation of the catalyst between the first stage that operates with partial combustion and the second stage that operates with total combustion is controlled.

It is in starting from the control of the circulation of catalyst between the first regeneration stage (I) and the second regeneration stage (II) that the precise value of the residual coke rate on the catalyst that is reintroduced into the reaction zone is obtained, and, no longer as in the prior art, in starting from parameters that are more or less easy to control such as the ratio between the quantity of air that is introduced in the regeneration stage(s).

In addition, it was noted in a surprising manner that the regenerated catalyst according to the invention, i.e., resulting from the mixing between, on the one hand, the partially regenerated catalyst with a residual coke rate of between 0.3 and 0.7%, and, on the other hand, the catalyst that is totally regenerated with a residual coke rate that is less than 0.15%, is not equivalent to the partially regenerated catalyst that would have an intermediate residual coke rate in proportion to the mass refluxes.

This non-equivalence is reflected in particular by an LCO yield that is slightly improved relative to the one that would be obtained with a homogeneous, partially regenerated catalyst, which is probably associated with a non-linearity in the accessibility of hydrocarbon molecules to the zeolite based on the coke content on the catalyst.

This means that the regenerated catalyst in terms of the invention consists of two different coke-rate populations.

The implementation of the invention will preferably be carried out in regeneration stages that operate in turbulent conditions or in transport conditions, corresponding for common FCC catalysts to surface speeds of the fluidization gas in the regenerator that are greater than 0.3 m/s for the turbulent conditions, and greater than 1.6 m/s for the transport conditions.

FIG. 1 below describes a first embodiment of the invention.

The coked catalyst, obtained from the reactor, is introduced via a pipe (1) into a chamber that contains a first fluidized bed (2) that corresponds to the first regeneration stage. In this chamber, the catalyst is brought into contact with a gas (3) that contains oxygen, for example ambient air compressed in advance, oxygen-enriched air, or oxygen that is more or less diluted by, for example, combustion smoke.

Combustion gas is introduced into the lower portion of the fluidized bed by means (4) that make possible a good distribution of gas on the cross-section of the regenerator. These means are, for example, distribution rings, multi-branched pipes, or perforated aperture plates, means that are well known to one skilled in the art that make possible a uniform fluidization of the catalyst over the cross-section of the regenerator (2).

To control the temperature by promoting the mixing of the catalyst, the fluidization speed in the dense phase of the fluidized bed will be maintained between 0.3 and 1.6 m/s, preferably between 0.5 and 1.2 m/s. With the distribution of the gas being uniform over the entire cross-section of the regenerator (2), the combustion is implemented essentially in the dense phase.

Nevertheless, in the dilute phase of the regenerator, the smoke will entrain significant quantities of catalyst, and dust will be extracted from the smoke in a first stage inside the regenerator by single-stage cycloning (5) or double-stage cycloning.

Combustion in the regenerator (2) is partial. The CO/CO2 ratio of the smoke is high and can typically be encompassed between 0.3 and 2.

The smoke that contains significant quantities of CO is evacuated from the regenerator downstream from the cyclones (6) and then undergoes post-treatments, such as post-combustion of CO, final extraction of dust, turbining, and exchange of heat to recover a portion of the energy of the smoke, elimination of sulfur and nitrogen oxides, and even separation of CO2.

The catalyst is drawn off from the first regeneration stage (2) by a pipe (7) that takes the catalyst into the dense phase of the fluidized bed to transport it to the reaction zone in which the reactions for cracking hydrocarbons contained in the heavy feedstock are implemented.

A portion of the catalyst that circulates in the first regeneration stage (2) is also drawn off and directed toward the second regeneration stage (8) that is located above the first regeneration stage (2). The transfer of catalyst between the two stages is implemented using a transport line (9), supplied by a gas flow (10), whose composition may be similar to the composition of the gas (3).

The flow rate of catalyst in the transport line (9) is controlled by the positioning of a "plug"-type valve (11) that is placed at the base of the transport tube (9).

If the gas that is used as a transport vector in the transport line (9) contains oxygen, a significant portion of the combustion can be produced during transport.

Preferably, the flow rate of gas (10) for transport in the lift will be kept constant and will make it possible to reach speeds that are preferably between 5 m/s and 10 m/s.

The flow of transported catalyst will advantageously be between 100 and 800 kg/s/m2, preferably between 300 and 600 kg/s/m2, which makes it possible to minimize the transport gas and the dissipation of pressure associated with the transport.

At the lift output, the suspension that consists of the partially regenerated catalyst obtained from the first regeneration chamber and the transport gas is introduced via openings that are in the upper portion of the transport line (9) into the second regeneration stage (8).

In this chamber, the catalyst is brought into contact with a combustion gas (13) that contains oxygen, for example ambient air that is compressed in advance, with oxygen-enriched air, or with oxygen that is more or less diluted by, for example, combustion smoke.

The combustion gas (13) is introduced into the lower portion of the fluidized bed with means (12) that make possible a good distribution of gas over the entire cross-section of the reactor (8).

These introduction means (12) are, for example, distribution rings, multi-branched pipes, or perforated aperture plates, means that are well known to one skilled in the art that allow a uniform fluidization of the catalyst over the entire cross-section of the regenerator.

To control the temperature by promoting the mixing of the catalyst, the fluidization speed in the dense phase of the fluidized bed will preferably be kept between 0.3 and 1.3 m/s, preferably between 0.5 and 1 m/s.

With the distribution of the gas being uniform over the entire cross-section, the combustion is implemented essentially in the dense phase.

Nevertheless, the smoke will entrain significant quantities of catalyst in the dilute phase of the regenerator (8), and dust is extracted from the smoke in a first stage by single-stage cycloning (14) as shown in FIG. 1 or by double-stage cycloning inside or outside of the regenerator.

The combustion in the regenerator (8) is total. The CO/CO2 ratio of the smoke (15) is very low and is generally less than 0.05, and even 0.01. The simple measurement of the oxygen content in the dry smoke, easily achievable, makes it possible to verify that excess oxygen remains after the combustion. An oxygen content of the smoke on the order of 1-2% by volume in general makes it possible to ensure that the combustion is total.

The smoke (6) that contains significant quantities of CO is evacuated from the first regeneration stage downstream from the cyclones (5) and then undergoes post-treatments such as the final dust extraction, turbining and heat exchange for recovering a portion of the energy of the smoke, elimination of the sulfur and nitrogen oxides, and even separation of CO2.

The smoke (15) of the second regeneration stage (8) can be shrewdly combined with the smoke (6) of the first regeneration stage to implement post-treatments.

The regenerated catalyst in the second regeneration stage (8) is then sent into the first regeneration stage (2). Thus, in the case that is described in FIG. 1, specific means for drawing off catalyst from the chamber (8) to the chamber (2) are implemented.

Within the framework of this invention, these means consist of a lateral transfer line (17) that supplies a fluidized chamber (16) that works at a fluidization speed of between 0.05 m/s and 0.1 m/s, the catalyst descending into this chamber at a speed that is less than 0.5 m/s, a fluidized chamber (16) in which the bubbles that are transported with the catalyst are released, and then the suspension is accelerated in a lower conical portion (19) before bringing the catalyst suspension in a downward flow into an essentially vertical transport tube (20), in which the suspension travels at a speed that is ideally between 1 m/s and 3 m/s.

A valve (21) is positioned at the bottom of the transport tube (20) and makes it possible, for example, to keep a constant level of catalyst in the second regeneration stage (8).

Under this valve (21), the transport tube (20) releases the suspension through its opening (22) into the dense phase or into the dilute phase of the first regeneration chamber (2). In FIG. 1, by way of example, the tube (20) releases the suspension into the dense phase of the first regeneration stage (2).

It may be advisable to optimize the distribution of catalyst that is obtained from the second regeneration stage (8) during its reintroduction into the first regeneration stage (2) to promote the homogeneity of the temperature in the first regeneration stage. Actually, the catalyst that is obtained from the second regeneration stage (8) is hotter than the catalyst that is mixed in the first regeneration stage (2) because of the additional combustion that is produced. Several solutions are possible.

It may be advisable to mix the catalyst that is obtained from the second regeneration stage (8) with the catalyst that is obtained from the reaction zone by ensuring that the two introduction points are close enough to minimize the thermal disruption in the first regeneration stage. "Close" is understood to be the fact that the introduction point of the coked catalyst that is obtained from the reaction zone, and the introduction point of the regeneration catalyst that is obtained from the second regeneration stage (8) are removed by a distance that does not exceed the radius of the first regeneration stage (2).

Figure 2:
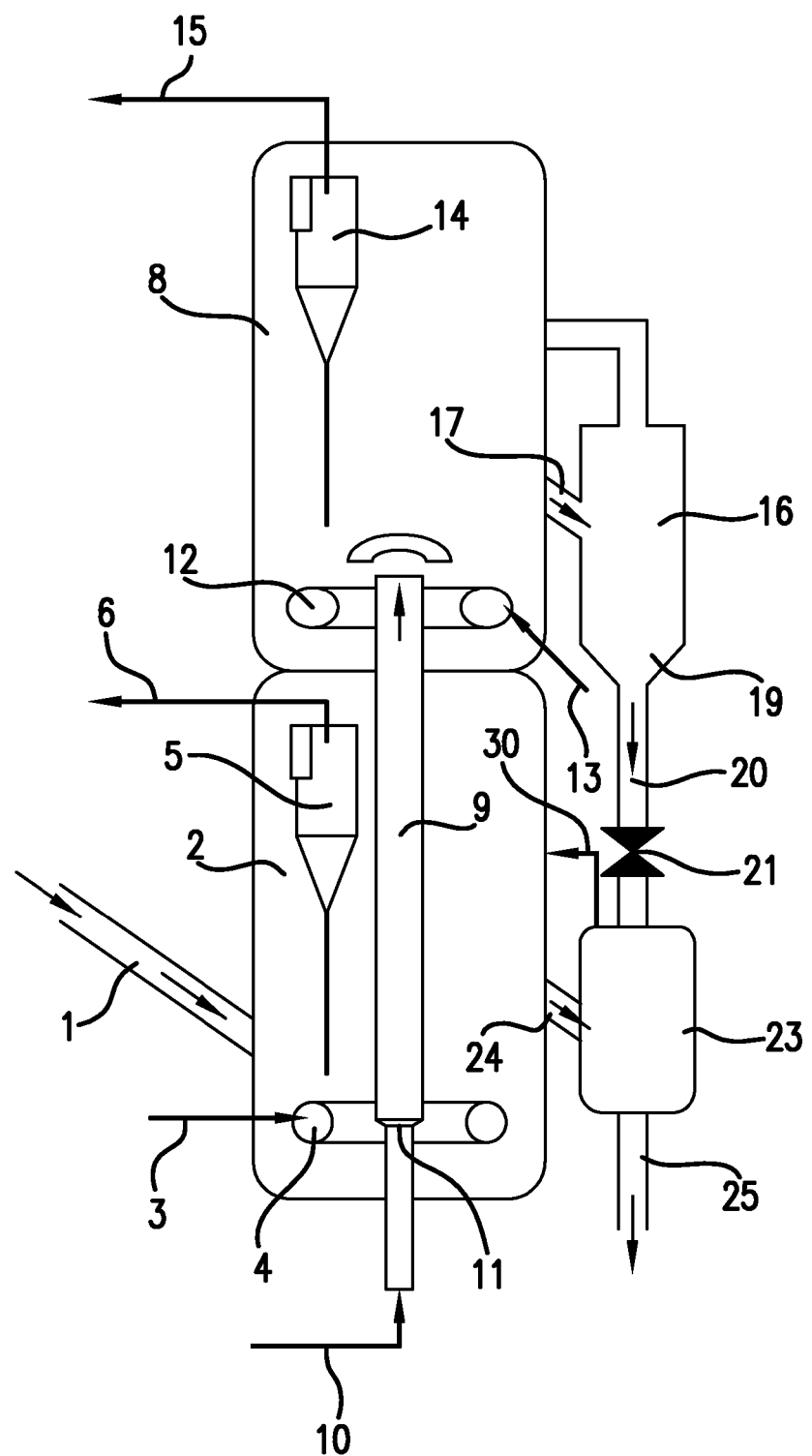
FIG. 2 shows a second embodiment of the invention in which the catalyst that is obtained from the second regeneration stage is mixed with one portion of the catalyst that is obtained from the first regeneration stage in a dedicated chamber.

FIG. 2 shows another implementation of the invention.

Figure 3:
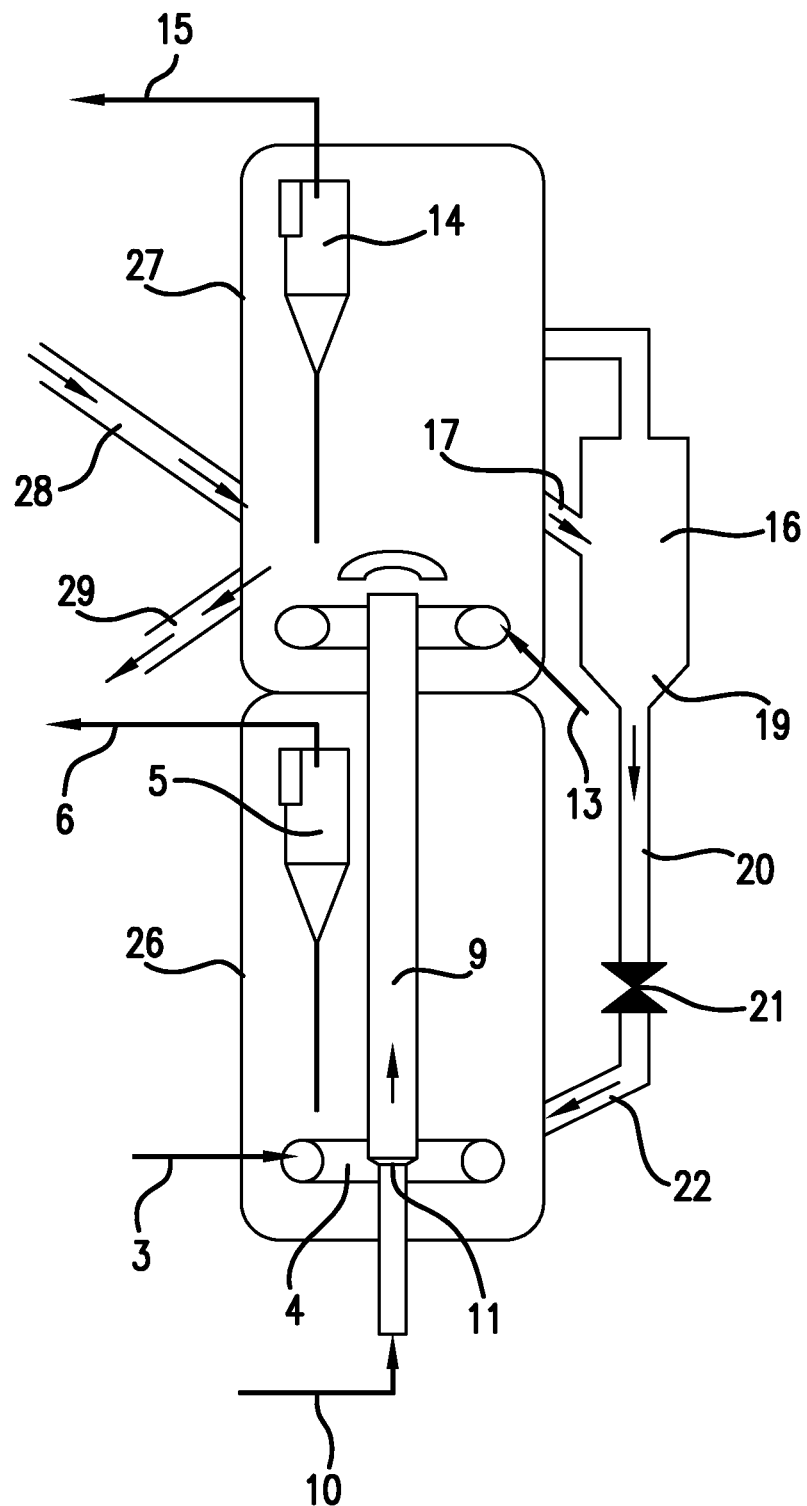
FIG. 3 shows a third embodiment of the invention in which the first regeneration stage is placed above the second regeneration stage. The catalyst flows by gravity from the first regeneration stage to the second regeneration stage.

The common numbers in FIGS. 2 and 3 designate the same elements.

Contrary to the configuration shown in FIG. 1, the catalyst that is obtained from the second regeneration stage (8) is not reintroduced into the first regeneration stage (2), but it is mixed with the catalyst flow that is drawn off from the first regeneration stage (2) into a chamber (23) that operates with a fluidized bed from which the mixture that is obtained is redirected to the reaction zone by the line (25).

The bed of the mixing chamber (23) is fluidized by an inert gas (N2, H2O) or by an oxygen-containing gas that makes it possible to implement a portion of the combustion. The smoke that is obtained from said combustion is, for example, remixed in the dilute phase of the first regeneration stage using a pipe (30) that connects the mixing chamber (23) and the dilute phase of the first regeneration stage (2). The chamber (23) is a mixing zone. It is characterized by a mean dwell time of the catalyst that was preferably less than 60 s. The fluidization speed remains moderate and is preferably less than 10 cm/s. In the case where a heat exchanger is installed for extracting a portion of the heat that is released by the combustion of the coke in the regenerator, it may be advantageous to install the heat exchanger in this chamber (23).

The essential difference between the configuration that is described in FIG. 1 and the configuration that is described in FIG. 2 resides in the fact that the temperature at which the partial combustion is carried out in the first regeneration stage is higher than in the case where the catalyst is reintroduced into said first regeneration stage (according to FIG. 1), which makes it possible to promote the combustion reactions by making them faster.

Nevertheless, it may be advisable to limit the temperature in the first regeneration stage (2), for example for reducing the hydrothermal deactivation of the zeolite, and the configuration that is described in FIG. 2 is then particularly suited to units that operate with high coke deposits on the catalyst.

In this case, it is generally desired to limit the temperature of the first regeneration stage (2) to values that are less than 730° C., preferably less than 710° C.

FIG. 3 is another variant that allows the implementation of the invention.

In this case, the first regeneration stage (27) is located above the second regeneration stage (26). The catalyst that is obtained from the reaction zone (28) comes into the first reaction zone (27) that is located above the second reaction zone (26). It is drawn off from the first reaction zone by the pipe (29) to be reintroduced in partially regenerated form into the reaction zone. The circulation between the two regeneration chambers is possible using the flow by gravity of the first regeneration stage (27) to the second regeneration stage (26) through the draw-off wells (16) that have a lower conical portion (19), the transport tube (20), and the valve (21).

The pneumatic transport from the second stage (26) to the first stage (28) is implemented through the plug valve (11) and the lift (9).

The advantage of the invention resides in a regeneration system that makes possible a fine control of the residual coke content deposited on the regenerated catalyst, i.e., returning to the reaction zone, in an FCC that operates in partial combustion.

The configurations of the regeneration zone that are described in FIGS. 1 to 3 are actually particularly suited to an adjustment of the control of the activity of the catalyst via the deposition of coke on the catalyst. The action means is the flow of catalyst that has undergone total regeneration in the second regeneration stage (8) to the first regeneration stage (2), or to the fluidized mixing chamber (23).

Actually, the quantity of catalyst that is exposed to total regeneration conditions depends directly on the circulation of catalyst that circulates from the first regeneration stage (2) to the second stage (8). This quantity of catalyst is easily controllable through transport systems that are equipped with valves (21) that are located between the two regenerators. It is possible, for example, to impose a flow set point by controlling the opening of the valve that is positioned on the transport line between the regenerator that operates by partial combustion and the regenerator that operates by total combustion, and to slave the opening of the valve (21) that is located on the transport line of the regenerator that operates with total combustion (8) to the regenerator that operates with partial combustion (2) in the regulation of a constant level in the regenerator that operates with total combustion. This strategy then makes it possible to control continuously and finely the quantity of catalyst that undergoes the total combustion.

So as to implement the total combustion in the second regenerator, it is advisable to maintain conditions of excess oxygen in the smoke of the latter, which makes it necessary to adjust the distribution of air between the two regeneration chambers when the circulation of catalyst varies between the two regeneration chambers.

For these purposes, it may be possible, for example, to slave the air flow in the second regeneration stage (8) to the oxygen content of its smoke.

With a system such as those described in FIGS. 1 to 3, if it is desired to increase the coke content on the regenerated catalyst that is sent into the cracking zone, it is enough to reduce the circulation of catalyst between the two regeneration stages.

If, in contrast, it is desired to reduce said coke content, it is necessary to increase the circulation of catalyst between the two regeneration stages.

The variation of the circulation of catalyst is accompanied by a modification of the distribution of the air flow between the two regeneration stages so as to maintain regeneration conditions that are suitable for total combustion in the second regenerator, characterized by excess oxygen in the smoke of at least 0.5% by volume relative to the dry smoke, preferably greater than 1% by volume relative to the dry smoke.

The operation of such a system makes it possible to control the coke content of the regenerated catalyst very finely. When the circulation between the two regeneration stages changes, however, the quantity of burned coke with total combustion increases and the exothermicity of the overall regeneration increases. The result is an increase of the temperature of the catalyst that returns to the reaction zone that is dedicated to cracking.

In an FCC that is operated with a constant feedstock flow rate, operating adiabatically without extraction of additional heat other than the reheating of fluids involved in the cracking and the regeneration of the catalyst, it is possible to note that the increase of the circulation between two regeneration zones (for the purpose of reducing the residual coke content on the regenerated catalyst) is accompanied by a reduction of the catalyst circulation.

If it is desired to keep the circulation of catalyst constant under these conditions (to better control the reaction based on the quantity of residual coke on the regenerated catalyst), it then is possible to install in the regeneration zone a vapor production system (heat exchanger), such as a system for cooling the catalyst that was already well described in the literature and known to one skilled in the art under the English term "cat-cooler."

This exchanger preferably will cool the catalyst that is obtained from the second regenerator, already exposed to total regeneration conditions. With such a piece of equipment installed in the regeneration zone, if the quantity of heat that is extracted is adjusted based on the circulation of catalyst, it is then possible to vary the coke content of the regenerated catalyst without changing its flow rate to the catalytic cracking reaction zone that is operated with a constant feedstock flow rate and temperature.

Other means can be considered for controlling the thermal balance of the unit in the case of very heavy feedstocks.

It is possible, for example, to extract heat in the cracking reaction zone by recycling the liquid hydrocarbon fractions that, by being evaporated, will consume a portion of the excess heat associated with the production of coke. This technology, called MTC (abbreviation of "mix temperature control" that it is possible to translate by control of the mixing temperature) technology, is particularly advantageous to implement with the recycling of liquid fractions corresponding to the distillation interval of between 150 and 300°, drawn off from the products that are already cracked in the reaction zone.

EXAMPLES

The first example describes the operation of a catalytic cracking unit that operates with a regeneration system that is identical to the one that is described in FIG. 1.

The feedstock flow rate (Ff) in the reaction zone and the cracking conditions (ROT=output temperature of the riser) are kept constant at a very moderate temperature of 490° C. that promotes the production of LCO.

The catalyst is regenerated in a system with two regenerators, only a portion of the catalyst being exposed to total combustion conditions.

Table 1 below shows that by varying the quantity of catalyst between the two regenerators, and by adjusting the streams of air in the first and the second regenerator for keeping constant total combustion conditions (1% by volume of excess dry smoke) in the second regenerator and partial combustion conditions (CO/CO2 molar equal to 1) in the first regenerator, it is possible to vary the coke content of the regenerated catalyst (CRCreg) in a field that ranges From 0.19 when the circulation between the two regenerators represents 70% of the circulation between the regeneration zone and the catalytic cracking zone, To 0.52, when this circulation does not represent more than 10% of the circulation between the regeneration zone and the catalytic cracking zone.

In addition, by reducing the advance of the combustion in the first stage, by passing from 62% to 47%, it is possible to reach a residual coke rate of 0.68% on the catalyst by making 10% of the catalyst circulate between the two regenerators.

This is reflected by a very significant variation of the activity of the catalyst.

Under these conditions, these variations are accompanied by an increase of the C/O ratio that passes from 4.4 to 6.5 because of the change in temperature of the catalyst at the end of the regeneration.

TABLE 1

| | | | | | | | |
|---|---|---|---|---|---|---|---|
| Ff | Feedstock flow rate | t/h | 153.8 | 153.8 | 153.8 | 153.8 | 153.8 |
| Fc | Catalyst flow rate | t/h | 1,000 | 864.6 | 761.5 | 680 | 1,245 |
| C/O | C/O | (—) | 6.5 | 5.62 | 4.95 | 4.42 | 8.1 |
| ROT | Riser output temperature | ° C. | 490 | 490 | 490 | 490 | 490 |
| Fcr | Catalyst flow rate ranging from Reg 1 to Reg 2 | t/h | 100.0 | 259.4 | 380.8 | 476.0 | 125.0 |
| TFcr | Catalyst flow rate ranging from Reg 1 to Reg 2 | % circulation | 10 | 30 | 50 | 70 | 10 |
| CRCreac | Coke on the reactor output catalyst | (%) | 1.45 | 1.45 | 1.45 | 1.45 | 1.45 |
| PRCOK | % Burned incoming coke at reg 1 | % | 62 | 62 | 62 | 62 | 47 |
| CRCreg 1 | Coke on the reg 1 output catalyst | (%) | 0.58 | 0.58 | 0.58 | 0.58 | 0.75 |
| CRCReg 2 | Coke on the reg 2 output catalyst | (%) | 0.02 | 0.02 | 0.02 | 0.02 | 0.02 |
| CRCreg | Coke on the reg output catalyst | (%) | 0.524 | 0.412 | 0.3 | 0.188 | 0.68 |
| Air Reg 1 | Combustion air at Reg 1 | kg/s | 27.4 | 23.7 | 20.9 | 18.6 | 25.2 |
| Air Reg 2 | Combustion air at Reg 2 | kg/s | 1.95 | 5.1 | 7.4 | 9.3 | 3.2 |
| Treg 1 | Temperature Reg 1 | ° C. | 661.0 | 661.0 | 661.0 | 661.0 | 622.0 |
| Treg2 | Temperature Reg 2 | ° C. | 779.0 | 779.0 | 779.0 | 779.0 | 779.0 |
| Trg | Return temperature to the reactor | ° C. | 673.0 | 697.0 | 720.0 | 744.0 | 637.0 |

The second example describes the operation of the same catalytic cracking unit that operates with a regeneration system that is identical to the one described in FIG. 1, in which a heat exchanger, of variable power, has been installed in the chamber (23) for mixing partially regenerated and totally regenerated catalysts.

The feedstock flow rate (Ff) in the reaction zone and the cracking conditions (ROT=riser output temperature) are kept constant at a very moderate temperature of 490° C. that promotes the production of LCO and are identical to those of Example 1.

The catalyst is regenerated in a system with two regenerators, only a portion of the catalyst (Fcr) being exposed to total combustion conditions.

Table 2 below shows that by varying the quantity of catalyst between the two regenerators, by adjusting the streams of air in the first and the second regenerator to keep constant total combustion conditions (1% by volume of excess dry smoke in the second regenerator) and partial combustion conditions (molar CO/CO2 equal to 1 in the first regenerator), and by adjusting the heat that is extracted by the heat exchanger (PCC), it is possible to vary the coke content of the regenerated catalyst (CRCreg) in a field that ranges From 0.19 when the circulation between the two regenerators represents 70% of the circulation between the regeneration zone and the catalytic cracking zone To 0.52, when this circulation does not represent more than 10% of the circulation between the regeneration zone and the catalytic cracking zone.

It is known to one skilled in the art that this will be reflected by a very significant variation of the activity of the catalyst.

Under these conditions, the flow rate of catalyst circulating in the reaction zone remains constant, with the C/O being equal to 6.5 regardless of the circulation between the two regeneration chambers.

TABLE 2

| | | | | | | |
|---|---|---|---|---|---|---|
| Ff | Feedstock flow rate | t/h | 153.8 | 153.8 | 153.8 | 153.8 |
| Fc | Catalyst flow rate | t/h | 1000.0 | 864.6 | 761.5 | 680.0 |
| C/O | C/O | (—) | 6.5 | 6.5 | 6.5 | 6.5 |
| ROT | Riser output temperature | °C. | 490.0 | 490.0 | 490.0 | 490.0 |
| Fcr | Catalyst flow rate ranging from Reg 1 to Reg 2 | t/h | 100.0 | 259.4 | 380.8 | 476.0 |
| TFcr | Catalyst flow rate ranging from Reg 1 to Reg 2 | % circulation | 10 | 30.0 | 50.0 | 70.0 |
| CRCreac | Coke on the reactor output catalyst | (%) | 1.45 | 1.45 | 1.45 | 1.45 |
| CRCreg 1 | Coke on the reg 1 output catalyst | (%) | 0.58 | 0.58 | 0.58 | 0.58 |
| CRCReg 2 | Coke on the reg 2 output catalyst | (%) | 0.02 | 0.02 | 0.02 | 0.02 |
| CRCreg | Coke on the reg output catalyst | (%) | 0.524 | 0.412 | 0.3 | 0.188 |
| Air Reg 1 | Combustion air at Reg 1 | kg/s | 27.4 | 23.7 | 20.87 | 18.6 |
| Air Reg 2 | Combustion air at Reg 2 | kg/s | 1.95 | 5.06 | 7.45 | 9.31 |
| Treg 1 | Temperature Reg 1 | °C. | 661.0 | 661.0 | 661.0 | 661.0 |
| Treg 2 | Temperature Reg 2 | °C. | 779.0 | 779.0 | 779.0 | 779.0 |
| PCC | | MW | 0.0 | 6.6 | 11.4 | 15.4 |
| Trg | Return temperature to the reactor | °C. | 673.0 | 673.0 | 673.0 | 673.0 |

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding French application Ser. No. 10/01.031, filed Mar. 15, 2010, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. Process for catalytic cracking of a hydrocarbon feedstock with a boiling point that is greater than 350° C., implementing a fine control of the residual coke level on the regenerated catalyst, whereby said process comprises:

reacting in at least one reaction zone that brings into contact, in a transported bed, the hydrocarbon feedstock to be treated and the catalyst, and regenerating the coked catalyst used in the reaction in a regeneration zone at the output of the reaction zone, whereby said regeneration zone is divided into a first regeneration stage (2) that contains a fluidized bed working in partial combustion, generating a catalyst whose residual coke rate is between 0.3% and 0.7%, and a second regeneration stage (8) that contains a fluidized bed that is placed in series relative to the first regeneration stage, and working in total combustion and generating a catalyst whose residual coke rate is less than 0.15%, whereby the catalyst is transported between the first regeneration stage (2) and the second regeneration stage (8) by a transfer line (9) fed by a gas flow rate (10) and the catalyst flow rate in the transfer line (9) is controlled by a plug valve (11) located at the bottom of the transfer line (9), whereby the regenerated catalyst that is obtained following the mixing of the partially regenerated and totally regenerated catalysts has a residual coke rate that is greater than 0.15%, whereby said coke rate is obtained by the control of the circulation of the totally regenerated catalyst that is obtained at the output of the second regeneration stage, such that:

a portion of the catalyst from the first regeneration stage (2) running in partial combustion is sent to a fluidized dedicated chamber (23), and the catalyst from the second regeneration stage (8) running in total combustion is sent to the fluidized dedicated chamber (23) through the following:

a) a fluidized chamber (16) that works at a fluidization speed of between 0.05 m/s and 0.1 m/s, the catalyst descending into this chamber at a speed that is less than 0.5 m/s, b) a dense fluidized pipe (20) that works at a transport speed of the catalyst of between 1 and 3 m/s, c) a valve (21) for control of the flow rate of catalyst that is slaved to the level of catalyst in the second regeneration stage (8) said valve (21) being located up flow of a dedicated fluidized chamber (23), wherein said dedicated fluidized chamber (23) operates at a fluidization speed that is less than 10 cm/s, and sending the regenerated catalyst from the dedicated fluidized chamber (23) to the reaction zone.

2. Catalytic cracking process according to claim 1, wherein the first regeneration stage is operated at a fluidization speed that is between 0.3 and 1.6 m/s.

3. Catalytic cracking process according to claim 1, wherein the first regeneration stage is performed with a CO/CO2 ratio in smoke of between 0.3 and 2.

4. Catalytic cracking process according to claim 1, wherein the second regeneration stage is performed at a fluidization speed of between 0.3 and 1.3 m/s.

5. Catalytic cracking process according to claim 1, wherein the second regeneration stage is performed with a $CO/CO_2$ ratio in smoke that is less than 0.05.

6. Catalytic cracking process according to claim 1, wherein a heat exchanger that generates vapor is implanted in the dedicated chamber (23) where the regenerated catalyst that is obtained from the second regeneration stage is mixed with the partially regenerated catalyst that is obtained from the first regeneration stage.

7. A catalytic cracking process according to claim 1, wherein the regenerated catalyst obtained following the mixing of the partially regenerated and totally regenerated catalysts has a residual coke rate that is greater than 0.25%.

8. A catalytic cracking process according to claim 2, wherein the first regeneration stage is operated at a fluidization speed that is between 0.5 and 1.2 m/s.

9. A catalytic cracking process according to claim 4, wherein the second regeneration stage is performed at a fluidization speed of between 0.5 m/s and 1 m/s.

10. A catalytic cracking process according to claim 5, wherein the second regeneration stage is performed with a $CO/CO_2$ ratio in smoke that is less than 0.01.

* * * * *